United States Patent [19]
Cioffi

[11] 3,814,129
[45] June 4, 1974

[54] SAMPLING VALVE

[75] Inventor: Francis J. Cioffi, Somerville, N.J.

[73] Assignee: E. R. Squibb & Sons, Inc., Princeton, N.J.

[22] Filed: Sept. 25, 1972

[21] Appl. No.: 292,036

[52] U.S. Cl............................ 137/625.11, 251/309
[51] Int. Cl............................................ F16k 11/08
[58] Field of Search..... 137/625.11, 625.15, 625.16, 137/625.41; 251/309, 311; 73/424

[56] References Cited
UNITED STATES PATENTS

| | | | |
|---|---|---|---|
| 1,113,129 | 10/1914 | Marr............................ | 137/625.11 |
| 2,312,941 | 3/1943 | Tucker.......................... | 137/625.11 |
| 2,777,433 | 1/1957 | MacCracken.............. | 137/625.41 X |
| 3,034,528 | 5/1962 | Wharff, Jr.................. | 137/625.11 X |
| 3,192,954 | 7/1965 | Gerhold et al................ | 137/625.11 |
| 3,605,812 | 9/1969 | Richter.......................... | 251/309 X |

Primary Examiner—William R. Cline
Attorney, Agent, or Firm—Lawrence S. Levinson; Merle J. Smith; John J. Archer

[57] ABSTRACT

An automatic sampling valve selectively samples fluid from a multiplicity of fluid supply conduits. The supply conduits are connected to a truncated conical barrel. A compatibly dimensioned plug is contiguously received in said barrel and has a peripheral channel formed thereon. The channel conducts fluid from said conduits to a suitable discharge passage. The plug is rotatable in the barrel and the channel is designed to alternately register with consecutive conduits and to intermittently close all of the conduits.

6 Claims, 4 Drawing Figures

PATENTED JUN 4 1974 3,814,129

SAMPLING VALVE

BACKGROUND OF THE INVENTION

The present invention relates to a novel sampling valve to selectively sample fluid from a multiplicity of fluid supply conduits.

For applications such as laboratory activities, valves capable of selectively passing fluid from numerous supply passages have many uses. One particular application is found in the simultaneous dissolution testing of the tablet form of medicinal preparations. For a variety of reasons it is necessary in the drug industry to have precise data regarding the dissolution rate of particular drugs, especially those in tablet form. The equipment used for such a test is rather expensive, and where each tablet is tested separately the time involved in obtaining the needed data is quite high. The apparatus is caused to operate over great time periods consequently shortening the life of the equipment. Under these conditions the simultaneous testing of a number of tablets is a necessity rather than a scientific convenience.

Present systems for simultaneously testing several tablets have not adequately solved the problem, since at least some of the components of the test apparatus need be duplicated. For instance, a commercially available spectrophotometer must be of the multi-cell type (one cell for each tablet) where several tablets are to be simultaneously tested. Obviously, the multi-cell type is more expensive and less reliable than the single cell spectrophotometer. These systems also evidence difficulties in the areas of chemical analysis and data generation and acquisition. Even where duplication of equipment is not necessary, the arrangement of the prior art system can be expensive, complicated and unreliable in that the systems are basically overloaded. What has been needed in this field is a device, such as an automatic valve system, which permits the simultaneous testing of a number of tablets, but which also allows the testing apparatus to analyze a single sample solution at any particular time. In other words, the valve system should be able to intermittently sample from a particular solution, simultaneously shutting off the other sample solutions. The present invention permits the optimum utilization of the testing apparatus without placing an undue strain on the crucial components.

The foregoing discussion is obviously but one example of the many applications for a sampling valve of the type disclosed herein. Such a valve will find use both within and without the laboratory for literally any application which requires the selection of one or more sample solutions from a multiplicity of fluid supply passages. Additionally, the present invention accomplishes this objective with a very simple and inexpensive device.

SUMMARY OF THE INVENTION

It is an object of the present invention to provide a valve capable of automatic and selective sampling from a multiplicity of fluid supply passages.

Another object of the present invention is the provision of a valve which can sample from one or several passages at a time, and which can intermittently shut-off all supply passages.

Yet another object of the present invention is the provision of a sampling valve which is of simple construction, is easy to operate and characterized by an economy of moving parts.

In accordance with the above designs a sampling valve has a multiplicity of fluid supply conduits attached to an outer member or barrel. An inner member or plug has a channel which registers with the conduits and a discharge passage. The plug is contiguously received in the barrel, the contact thereby forming a closure for the channel. The plug is rotated by suitable means, and the channel is designed such that it selectively registers with consecutive conduits. The channel can also intermittently close all conduits by registering only with the inner wall of the barrel.

The above and other objects of the present invention will be apparent from the following description when read in conjunction with the drawing.

DETAILED DESCRIPTION

Figure 1:
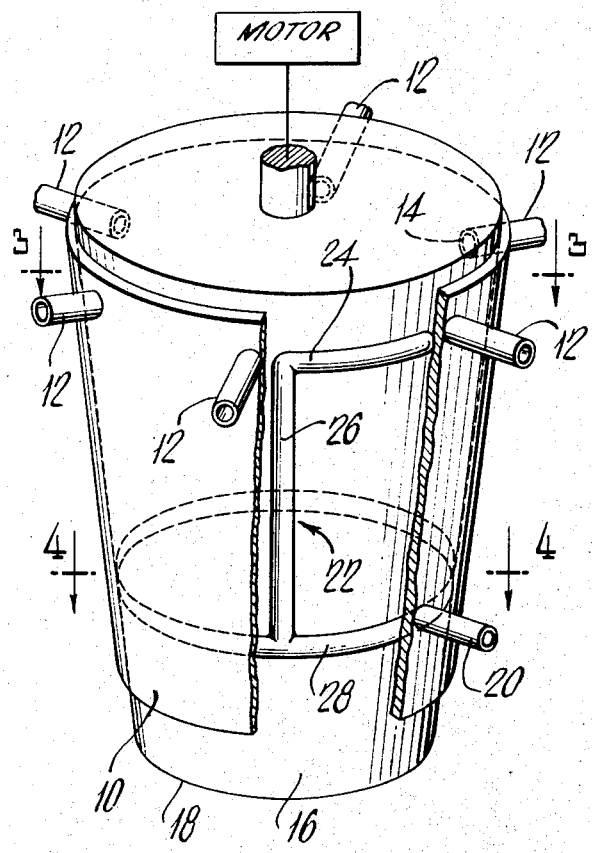
FIG. 1, is a partially cut-away perspective view of a primary embodiment of the present invention.

Referring to FIG. 1, a preferred embodiment of the present invention comprises an outer member 10. The member 10 is in the nature of a hollow barrel and of conical shape. Preferable materials of manufacture are glass or plastic which are transparent to permit visual observation of the flow of fluid.

At the upper portion of the barrel 10 are the attached fluid conduits 12. The conduits 12 attach to the barrel at the ports 14. The conduits 12 are shown here as being equally spaced and all lying in the same plane (perpendicular to the cone axis). Also, in this embodiment six conduits are shown. It should be clearly understood that the present invention is operative for any number of conduits as well as embodiments which call for unequal spacing.

An inner member, or plug 16, is contiguously received in the barrel 10. The plug 16 is compatible with the barrel 10, or, in other words, the corresponding elements of the barrel 10 and plug 16 are parallel and contiguous. The fit between the barrel and plug is such as to bar the passage of liquid through the interface, except as will be hereinafter described. In preferred embodiments, the plug 16 is longer than the barrel 10, extending below that barrel, and can be made of teflon or like material for easy reception in that barrel. As here shown, the plug 16 is solid having a flat bottom 18, but where the use requires, the plug 16 may be generally hollow. A discharge passage 20 is shown connected to the barrel 10, but as will be hereinafter mentioned, it can be formed in the plug 16.

Figure 2:
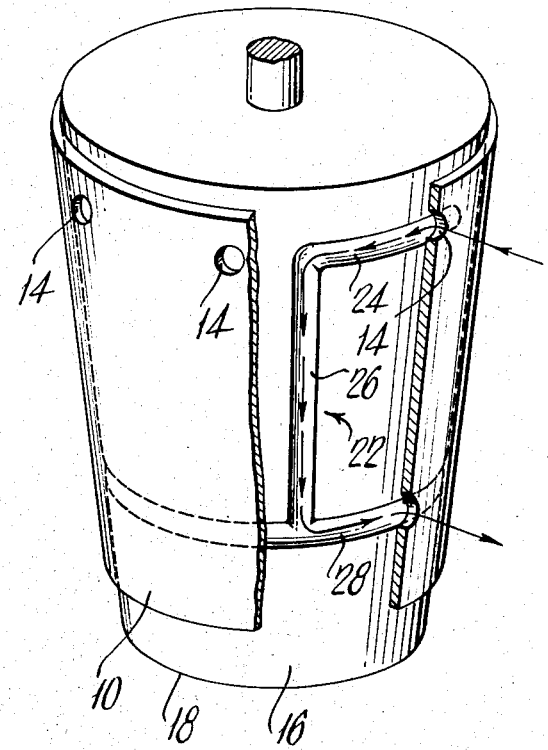
FIG. 2 is a partially cut-away perspective view of the instant invention showing the passage of fluid from an individual conduit.
Figure 3:
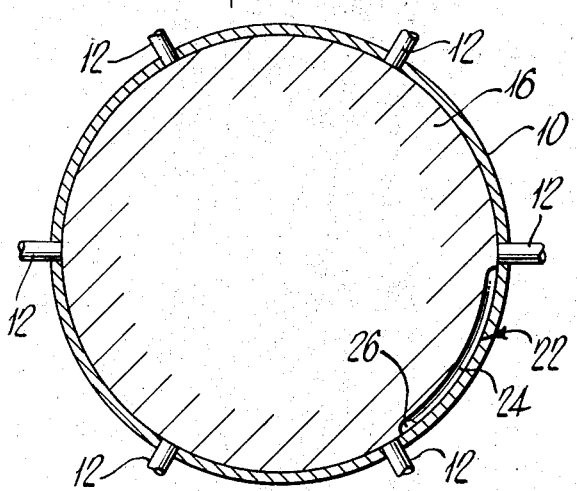
FIG. 3, is a top plan view of the valve of FIG. 1.
Figure 4:
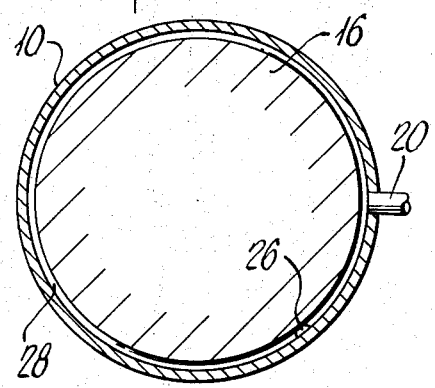
FIG. 4, is a bottom view of the valve of FIG. 1.

A channel, generally denoted as numeral 22 serves to conduct fluid from the conduits 12 to the discharge passage 20. The channel 22 is formed in the plug 16 and is open to its periphery. The contact between the plug 16 and barrel 10 provides a closure for the channel 22 insuring that fluid can pass controllably therethrough and not otherwise into the plug-barrel interface. The specific channel here illustrated comprises three sections: a first or top section 24; a second or midsection 26, and a third or bottom section 28. The top section is arcuate and is generally coplanar with the conduits 12 (in this case perpendicular to the cone axis). As shown in FIG. 2, the length of top section 24 is slightly less than the distance between two consecutive conduits 12. The specific reason for such a configuration will be described subsequently, but it should be recognized that the valve as described will be operative for other top section lengths. It is readily apparent that for the top section length illustrated, at any instant in time, only one conduit can be in fluid communication with that top section 24. However, should it be necessary to have at least two conduits 12 passing fluid through the valve, the top section 24 can be longer than the distance between the conduits.

The midsection 26 of the channel 22 is shown as being parallel to a conical element and generally perpendicular to the top section 24. Where necessary the midsection 26 can be arcuate and be at an acute or obtuse angle to the top section 24; but, it has been found convenient to maintain general perpendicularity between the top section 24 and midsection 26.

In the embodiment here illustrated, the bottom section 28 is shown encircling the plug 16 and in continuous registration with the discharge passage 20. In certain instances it may be desirable that the bottom section 28 not be continuous or even completely lie in one plane. In fact, such a bottom section would provide an additional means of regulating flow by being able to shut-off conduits 12 which are in fluid communication with the top section 24. Where constant fluid discharge is desirable, the circular bottom section 28 is necessary.

Before continuing, it should be noted that the valve, thus far described, can be made in reverse. That is, the channel 22 can be formed on interior of the barrel 10 and the conduits 12 formed in the plug 16. In such a system, the conduits 12 would be replaced by bores formed in the plug 16, but the operation of the valve would remain essentially unchanged. Additionally, in either system, the discharge passage 20 can be replaced by a bore formed in the plug 16, which bore being in fluid communication with the bottom section 28 would discharge fluid in a similar manner as does passage 20.

The structure of the valve having been defined, its operation will be described in a selected environment. Specifically, the valve is to be used to transmit fluid from six containers for simultaneous analysis. This test requires the continuous operation of expensive laboratory equipment but with as little duplication of equipment as possible. Another requirement is the provision of a short period of time for the test systems to wash out the old fluid completely before analyzing the incoming fluid. For such requirements the valve is designed with equally spaced conduits 12 of equal diameter. Suitable means, such as a motor 32 is provided to rotate the plug 16. The top section 24 is designed to be slightly shorter than the distance between consecutive conduits 12 which are supplied with a continuous flow of fluid. As the plug 16 is rotated, the top section 24 registers with a selected conduit 12. Fluid passes through that conduit, through the midsection 26 and into the bottom section 28. As the bottom section 28 is filled, the fluid passes into the discharge passage 20 and from there into the test apparatus. The fluid continues to flow in this manner as the top section 22 continues to move past the conduit 12. As soon as the top section 24 has passed the conduit 12, the flow from that conduit is shut-off. However, there is still residual fluid in the system which must wash out before fluid from the next successive conduit is analyzed. The top section 24 is therefore designed such that it is slightly shorter in length than the distance between two successive conduits 12. This permits flow into the valve to be completely shut-off allowing the residual fluid to wash out and the test apparatus readied for the next sample to be tested. The speed of plug rotation obviously can be controlled by the motor 32 to permit flow through the valve for any period of time as desired. When used in this environment the valve permits the simultaneous testing of several tablets without the duplication of expensive equipment.

The above described test represents only one possible use for the valve. Obviously, where it is desired to have concurrent flow from two or more conduits 12 through the valve, the top section 24 can be lengthened to simultaneously register with as many conduits as is needed. Additionally, the bottom section 28 can be made discontinuous to selectively control fluid flow. There is virtually no limitation on the design of the midsection 26 except that it be in fluid communication with the top 24 and bottom 28 sections.

While only one specific use for the valve of the instant invention has been described, it should be readily apparent that the subject valve has a multitude of uses in a wide variety of environments. It is intended that the appended claims apply to all such uses. Also, this invention may be embodied in several forms without departing from the spirit or essential characteristics of the claims. All charges that fall with the metes and bounds of the claims are intended to be embraced therewithin.

What is claimed is:

1. A valve which comprises a hollow truncated conical barrel as an outer member and a truncated conical plug as an inner member contiguously received in said outer member, means to rotate one of said members relative to the other about a common axis, at least two conduits for the transmission of fluid to said valve connected to said barrel, all said conduits connected at points in a single plane perpendicular to said common axis, the plug including a peripheral channel, the contact between said inner and outer members forming a closure for said channel, a discharge passage in fluid communication with one of said members and said channel, said channel comprises a first section generally lying in the same plane as said conduits, a second section in fluid communication with, and at an angle to, said first section, a third section in fluid communication with said second section and said discharge passage, said channel adapted to register with, and pass fluid from, said conduits to said discharge passage.

2. The valve of claim 1 wherein said channel alternately registers with consecutive conduits.

3. The valve of claim 1 wherein said conduits are equally spaced and lie in the same plane.

4. The valve of claim 1 wherein said channel is in fluid communication with one selected conduit at any time and in fluid communication with said discharge passage at all times.

5. The valve of claim 1 wherein said inner member is rotated in said outer member, and said third channel section is continuous and lies in a plane generally parallel to said plane of said conduits.

6. The valve of claim 1 wherein said first section is slightly shorter in length than the distance between two consecutive conduits, whereby all the conduits are intermittently closed.

* * * * *